US006173681B1

(12) United States Patent
Pope

(10) Patent No.: US 6,173,681 B1
(45) Date of Patent: Jan. 16, 2001

(54) LIQUID FEED PRE-HEATER

(76) Inventor: Michael P. Pope, N515 Howard Rd., Whitewater, WI (US) 53190

(*) Notice: Under 35 U.S.C. 154(b), the term of this patent shall be extended for 0 days.

(21) Appl. No.: 09/466,323

(22) Filed: Dec. 17, 1999

(51) Int. Cl.[7] ........................................................ F22D 5/26
(52) U.S. Cl. ..................... 122/451.1; 122/13.3; 122/14.3; 122/412; 119/51.01
(58) Field of Search .................................. 122/13.3, 14.3, 122/19.1, 451.1, 458, 412, 428, 429, 444; 137/11; 119/51.01, 51.13, 51.5, 56.1, 57.92

(56) References Cited

U.S. PATENT DOCUMENTS

| | | | |
|---|---|---|---|
| 1,119,391 | * 12/1914 | Becker .................................. 122/458 |
| 3,830,203 | * 8/1974 | Murphy ............................. 119/51.13 |
| 4,175,518 | * 11/1979 | Reames, Jr. .......................... 122/412 |
| 4,869,232 | * 9/1989 | Narang ................................ 122/412 |

* cited by examiner

Primary Examiner—Denise L. Ferensic
Assistant Examiner—Gregory A. Wilson
(74) Attorney, Agent, or Firm—Ryan Kromholz & Manion, S.C.

(57) ABSTRACT

The present invention is drawn to a device for heating liquid feed for veal calves, although this device may have wider application. The present invention is a pre-heater system used to raise the temperature of liquid feed that is being pumped from cold storage to a mixing tank prior to being fed to an animal. Additionally, the present invention is arranged to independently supply heated water externally of the system.

7 Claims, 3 Drawing Sheets

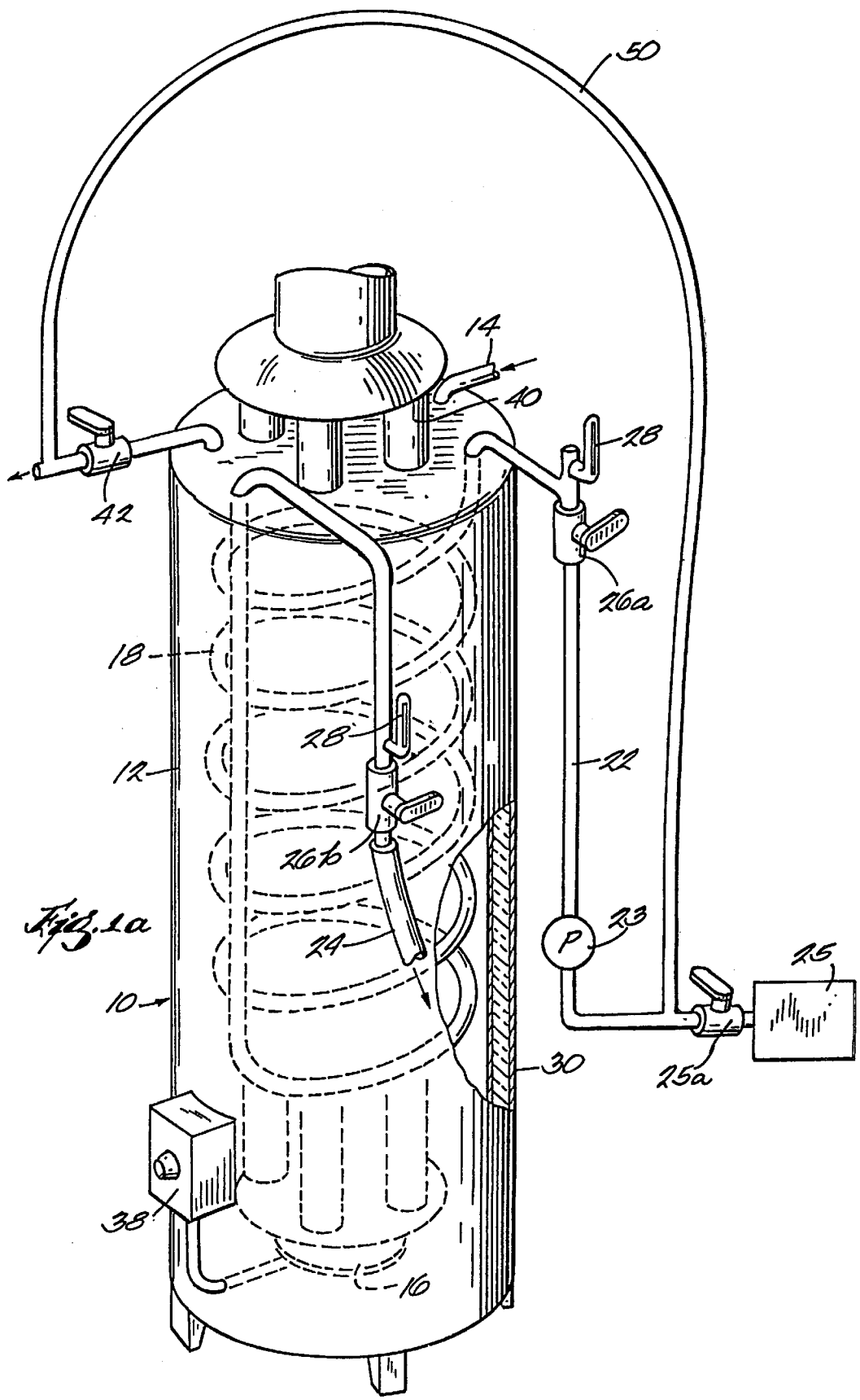

LIQUID FEED PRE-HEATER

BACKGROUND OF THE INVENTION

This invention relates to an automated, mechanical liquid feed pre-heating system. Bulk nutrient feed for livestock is commonly stored in a refrigerated environment for convenience of storage and to prevent spoilage. The nutrient must be heated to a predetermined temperature prior to feeding however, to allow the nutrient to reach its desired viscosity and palatability. Various pre-heating and feeding systems have been used to accomplish this result. One such device is disclosed in U.S. Pat. No. 4,803,955 granted to Gonsalves. Gonsalves discloses a complex, automated multi tank system having a combination of structural features, including solenoid actuated control valves, float switch assembly and nipple means, which are not shown in the present invention. Further, the Gonsalves reference does not include the independent heated water access system disclosed herein.

The pre-heating system of the present invention provides a multi-purpose system wherein feed is pre-heated, hot water is accessed, and cleaning is easily accomplished. Chilled nutrient is placed in the pre-heater wherein the nutrient is heated to the desired feeding temperature and pumped to a mixing and distributing area.

SUMMARY OF THE INVENTION

The present invention is drawn to a device for pre-heating liquid feed for veal calves, although it is to be understood that this device may have wider application. More specifically, the present invention is a pre-heater used to raise the temperature of liquid feed as it is being pumped from cold storage to a mixing tank prior to being fed to an animal.

The pre-heater of the present invention includes a stand-alone tank for heating water and a series of tubular fluid conduit coils. The water-heating tank is provided with a heating means. The fluid conduit coils include an inlet and an outlet for the liquid feed, a backflow conduit having an outlet for the hot water, and an inlet for the water source. Each inlet and outlet is further provided with valve shut-off means. The water tank is filled with water via an inlet on a water conduit. As the water contacts the heating element in the tank, it is heated to a predetermined temperature. The liquid feed conduit coil is immersed in the water tank, thereby taking on the temperature of the surrounding heated water. In use as a liquid nutrient pre-heater, nutrient concentrate is drawn from a cooled storage area into the feed concentrate coil in the pre-heating system. The feed concentrate moves through the warmed liquid feed conduit coil in the pre-heater. Transfer of heat occurs as the feed travels through the coil, and the liquid feed is warmed by the hot water surrounding the coils. The heated liquid feed exits the pre-heating system into a mixing tank where the feed is mixed with hot water to raise the temperature above a predetermined temperature. This predetermined temperature is dependent upon the chemical composition of the liquid feed. The liquid feed is then pumped to animal feeding devices. To ensure that all of the liquid feed has been removed from the pre-heater to the mixing tank, the liquid feed conduit coil is flushed by way of a backflow conduit section located intermediate the hot water outlet and the liquid feed conduit coil.

In addition to the preheating and flushing characteristics described above, the pre-heater is arranged to supply heated water externally of the system. This characteristic is of particular importance in a barn setting wherein washing and cleaning is desired.

DESCRIPTION OF THE DRAWINGS

FIG. 1a is a perspective view of an alternate embodiment of the present invention including an alternate flushing conduit.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
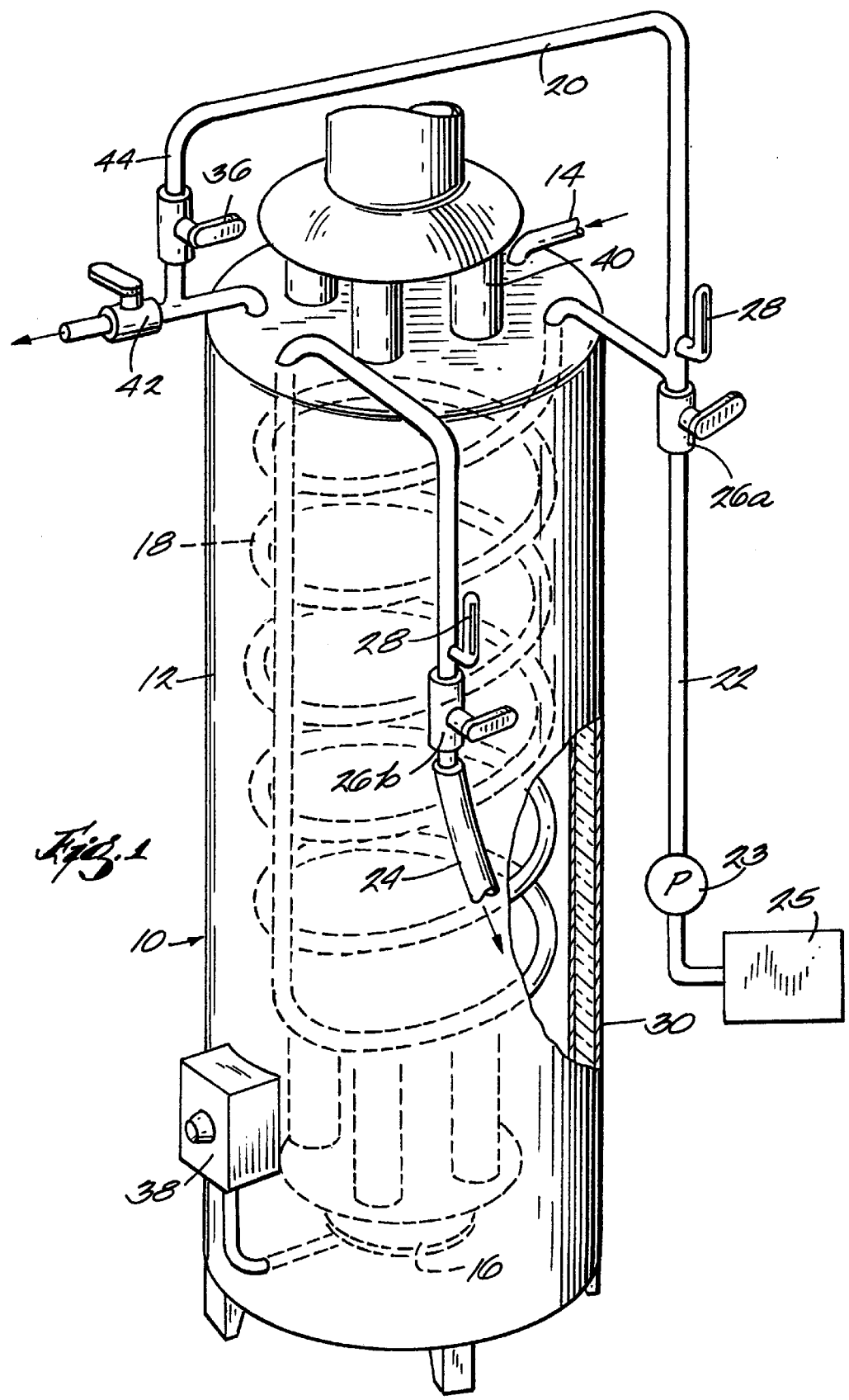
FIG. 1 is a perspective view of the pre-heater of the present invention and includes a portion partially cut away and a portion in phantom.
Figure 2:
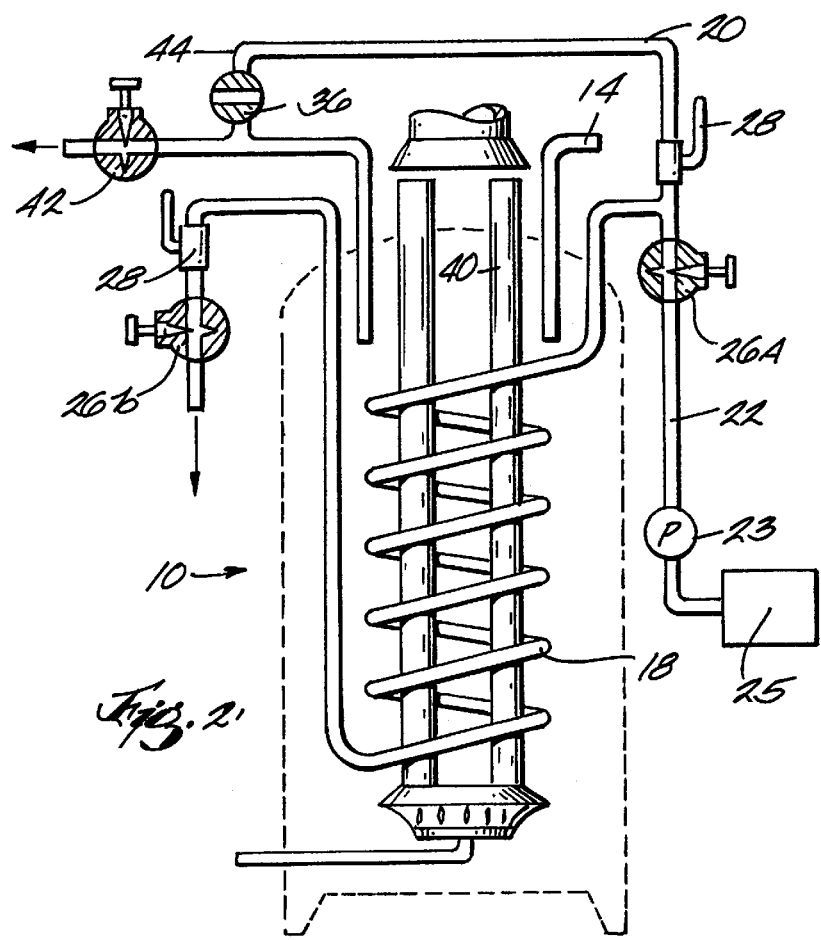
FIG. 2 is a plan view of the conduits and valves of the present invention with the water tank in phantom.
Figure 3:
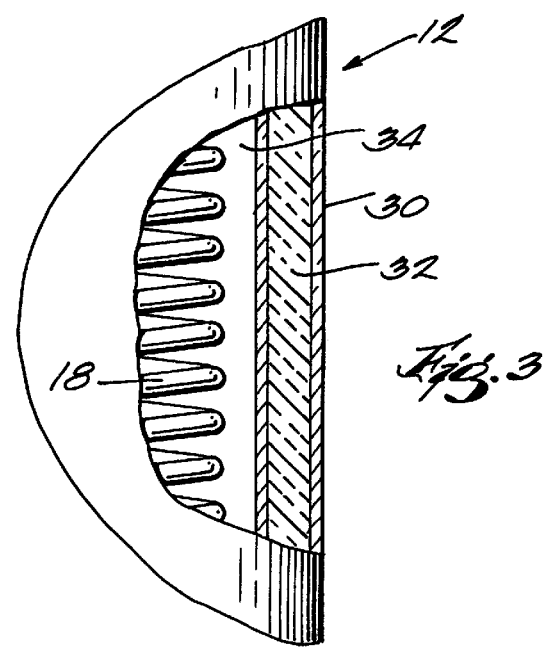
FIG. 3 is an enlarged fragmentary view showing the wall of the hot water tank.

Referring to FIG. 1, it can be seen that the preheater 10, includes a tank 12, water supply means 14, a gas-fired water heating element 16, a tubular liquid feed conduit 18, and a tubular backflow conduit 20. The liquid feed conduit 18 includes an inlet 22 controlled by an inlet valve 26a, inlet 22 communicating with a pump 23 further connected with a container 25 for storing chilled nutrient. The liquid feed conduit 18 is further provided with an outlet 24, the outlet 24 and inlet 22 are each respectively provided with flow rate valves 26a, 26b, and temperature sensing means 28. As shown in FIGS. 1 and 2, the valves 26a, 26b are indicated as manually operated, however it is within the province of this invention to utilize conventional programmable controller devices (not shown). The hot water tank 12 may be of the type commonly used with conventional hot water heaters, although any suitable tank having insulated walls 30 may be also used. As seen in FIG. 3, the wall 30 of the tank 12 may include an intermediate layer 32 having insulation capabilities in order to maximize the energy needed to heat the interior 34 of the tank 12. This feature is desirable especially when the tank 12 is to be used in climates having severe temperature fluctuations as in a winter having sub-zero temperature. The intermediate layer 32 increases the overall energy efficiency of the pre-heater. The water-heating element 16 may be of any type such as the gas or electric heating units used in conventional water heating tanks. As seen in FIG. 1, the heating element 16 is shown as a conventional gas heat exchanger under the control of a thermostat 38. The heating element 16 is further supplied with at least one flue 40 for exhaust of gases produced by the heating element 16 and to further assist in heating the water in the tank 12.

Referring to FIG. 1, it can be seen that the tubular liquid feed conduit 18 is preferably coiled to increase the overall surface area of the conduit 18 in the heated water environment. The water supplied by water supply means 14 and heated within the tank 12 is maintained in a heated condition, therefore the liquid feed passing through the feed conduit 18 may be heated to that same temperature. The number of coils used may be of any number depending on the flow rate desired and the temperature differential between the cooled feed entering the pre-heater and the desired exit temperature. It is to be understood that the greater the number of coils, the greater the total distance the feed must travel to the outlet, and at a uniform flow rate, the longer the feed is heated in the pre-heater. Furthermore, the feed conduit 18 is constructed of a material having good heat transfer capabilities, such as stainless steel tubing, and is disposed within the tank 12.

As best seen in FIGS. 1 and 2, the temperature of the liquid feed exiting the outlet 24 of the liquid feed conduit 18 is monitored by a temperature sensing device 28, seen as a thermometer in FIG. 1. A similar temperature-sensing device 28 is also located at the inlet 22. The temperature of the feed exiting at outlet 24 is regulated by way of the flow rate valve 26a located at the inlet 22 of the feed conduit 18 and the valve 26b located at the outlet 24. If the thermometer 28 at outlet 24 senses an unacceptably low temperature, the user may decrease the flow rate of the feed through the feed conduit 18 by partially closing the flow rate valves 26a, 26b. As the flow rate decrease, the feed remains in the pre-heater for a longer period of time prior to its exit at outlet 24. As the time spent in the pre-heater increases, so does the temperature of the liquid feed, until it reaches the temperature of the ambient water surrounding the liquid feed conduit 18.

After the desired amount of liquid feed has passed through the outlet 24, the liquid feed conduit 18 is adapted to be flushed to remove remaining feed and further to clean the conduit 18 for future use. Flushing of the liquid feed conduit 18 is accomplished using the backflow conduit 20. The backflow conduit 20 serves as a means of communication between the inlet 22 of feed conduit 18 and the heated water in the tank 12. To this purpose, the backflow conduit 20 is supplied with a shut off valve 36. When flushing of the feed conduit 18 is desired, the flow rate valve 26a located at the inlet 22 is closed and the shut off valve 36 on backflow conduit 20 is opened. The tank 12 is supplied with an excess of water from the water supply means 14 such that the excess water is forced past the open shut off valve 36 and into the backflow conduit 20. As the water is forced through the backflow conduit 20, it encounters the closed flow rate valve 26a on the inlet 22 of feed conduit 18. As the water reaches the closed flow rate valve 26a, it is forced back through the liquid feed conduit 18 and out the open flow rate valve 26b on outlet 24. After the fluid exiting the outlet 24 no longer contains liquid feed, the water supply means is discontinued and the shut off valve 36 is closed. The pre-heater 10 is in condition to receive chilled liquid nutrient for pre-heating when the flow rate valve 26a at inlet 18 is opened.

As shown in FIG. 1a, an alternate flushing conduit 50 may be provided between the outlet of feed tank 25, adjacent feed tank valve 25a, and heated water exit valve 42. This alternate flushing system works in the same manner as the system described above except that the alternate embodiment provides for flushing of the pump 23, conduit downstream of the pump 23, and valve 26a. Accordingly, this alternate arrangement provides for a more efficacious cleansing of the liquid feed pre-heater 10.

The pre-heater 10 is further supplied with an independent heated water access means, seen as a valve 42. As seen in FIG. 1, the pre-heater 10 is provided with a heated water exit valve 42. The heated water exit valve 42 is preferably located at the distal end 44 of backflow conduit 20. Heated water may be accessed directly from the tank 12 when the shut off valve 36 on backflow conduit 20 is in the closed position and the heated water exit valve 42 is in the open position. Heated water accessed in this way may be used for any of a variety of tasks, such as cleaning of used buckets or washing the user's hands. This feature is of particular importance when heated water is necessary for cleaning as it obviates the necessity of a separate, secondary water-heating unit.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A preheating system for preheating liquid feed nutrient, said system comprising:

a hot water tank;

water supply means for supplying water to said hot water tank;

a water-heating element for said hot water tank;

a tubular feed-transporting conduit immersed in said hot water tank and capable of independently containing and alternatively moving liquid nutrient or flushing water through said hot water tank;

said conduit including an inlet and an outlet, said inlet being provided with an inlet valve and said outlet being provided with an outlet shut-off valve;

said feed transporting conduit further including a back-flow conduit section;

said back-flow conduit section having a back-flow valve for controlling alternative fluid flow of liquid nutrient and flushing heated water from said tank through said back-flow conduit and said feed transporting conduit;

said inlet shut-off valve being arranged for alternatively controlling fluid flow within said feed transporting conduit and within said back-flow conduit;

storage means for retrieving said nutrient;

pump means for supplying and forcing fluid flow of said nutrient from said storage means into said feed-transporting conduit; and a normally closed on-demand valve communicating with said back-flow conduit section, said on-demand valve being arranged for external supply of heated water directly from said hot water tank.

2. The preheating system of claim 1 wherein said water heating element is provided with thermostatic control.

3. The preheating system of claim 1 wherein said water tank is further provided with at least one flue for exhaust of gases and simultaneously assisting in heating water in said tank.

4. The preheating system of claim 1 wherein said tubular feed-transporting conduit is configured as a coil.

5. The pre-heating system of claim 1 wherein said tubular feed-transporting conduit is stainless steel tubing.

6. The pre-heating system of claim 1 wherein said water heating element is a gas heating unit.

7. The pre-heating system of claim 1 wherein said water heating element is an electric heating element.

\* \* \* \* \*